United States Patent [19]

Duffy et al.

[11] Patent Number: 5,303,288
[45] Date of Patent: Apr. 12, 1994

[54] MULTIPLE MODE CELLULAR TELEPHONE CONTROL DEVICE

[75] Inventors: Paul E. Duffy, Ypsilanti; Jeffrey N. Golden, Southfield; Louis J. Bresinski, Jr., Trenton; Danny N. Korovesis, Redford, all of Mich.

[73] Assignee: Ford Motor Company, Dearborn, Mich.

[21] Appl. No.: 42,902

[22] Filed: Apr. 15, 1993

Related U.S. Application Data

[63] Continuation of Ser. No. 628,134, Dec. 17, 1990, abandoned.

[51] Int. Cl.⁵ ...................... H04M 1/27; H04M 11/00
[52] U.S. Cl. .................................... 379/59; 379/354; 379/355; 379/216
[58] Field of Search ..................... 379/58, 59, 63, 216, 379/354, 355; 395/425, 600, 800; 364/705.05

[56] References Cited

U.S. PATENT DOCUMENTS

| | | | |
|---|---|---|---|
| 4,475,013 | 12/1984 | Lee et al. | 379/216 |
| 4,852,146 | 7/1989 | Hathcock et al. | |
| 4,870,676 | 9/1989 | Lewo | |
| 4,875,229 | 10/1989 | Palett et al. | |
| 4,875,230 | 10/1989 | Blair | 379/63 |
| 4,896,370 | 1/1990 | Kasparian et al. | |
| 4,959,850 | 9/1990 | Marui | |
| 4,959,851 | 9/1990 | Tobolski, Jr. et al. | |
| 5,095,503 | 3/1992 | Kowalski | 379/354 |

FOREIGN PATENT DOCUMENTS

| | | | |
|---|---|---|---|
| 0023265 | 1/1987 | Japan | 379/59 |
| 0023266 | 1/1987 | Japan | 379/59 |
| 2239579 | 3/1991 | United Kingdom . | |

OTHER PUBLICATIONS

NovAtel, 3200/3300 Series TM brochure, Jan. 1990.
NovAtel, 825 brochure, Jan. 1990.
WO 81/02824; International Publication, WIPO, Alexander et al.; Memory Accessing System, Oct. 1981.

Primary Examiner—Curtis Kuntz
Assistant Examiner—Dwayne D. Bost
Attorney, Agent, or Firm—Mark Mollon; Roger L. May

[57] ABSTRACT

A mobile communication apparatus such as a cellular telephone for automotive use is provided with selectable modes for accessing stored telephone numbers either by speed-dial codes (i.e., memory storage location) or alphabetic names associated with each telephone number. A user interface is employed having an alpha mode for displaying and entering alphabetic names corresponding to telephone numbers. The alpha mode includes a jump function and a scrolling function for browsing stored alphabetic names. A normal mode is provided for storing telephone numbers at desired storage locations. A speed-dial mode is also provided for instant dialing of the most frequently called numbers.

11 Claims, 5 Drawing Sheets

MULTIPLE MODE CELLULAR TELEPHONE CONTROL DEVICE

This application is a continuation of application Ser. No. 628,134, filed Dec. 17, 1990 now abandoned.

BACKGROUND OF THE INVENTION

The present invention relates to controlling operation of mobile telephones and more specifically to controlling recall and storage of telephone numbers and associated information in a cellular telephone memory using a multiple-mode user interface.

Digitally controlled mobile telephones typically provide a large number of memory locations for storing frequently called telephone numbers. This is particularly useful in automobile cellular telephones used in order to minimize the number of buttons that are pressed (i.e., keypresses) to initiate a call. A typical telephone unit may offer up to 100 stored numbers.

In order to provide convenient use of the memory capabilities, the recall and storing of telephone numbers is preferably quick and easy to implement. Furthermore, it is desirable from a cost and size standpoint to use a compact display in association with displaying the phone numbers and other information.

Individual preferences may vary as to the easiest way to remember a telephone number or a party to be called. Furthermore, the ability to remember a number, a speed-dial code, or a name is related to the frequency at which the particlar number is called. Even though every telephone number in memory may have a corresponding speed-dial code (e.g., its memory location), it is unlikely that a person could remember the speed-dial codes for a large number of stored telephone numbers. In some instances, alphabetic names associated with the number may be easier for a person to remember. Thus, the search for a convenient-to-use mobile telephone design is subject to the apparently conflicting desires to make large amounts of stored information available to the user, but with a minimum number of steps to be followed to access each individual piece of information and with a compact apparatus that displays only the needed information.

SUMMARY OF THE INVENTION

It is a principal object of the present invention to provide method and apparatus for operating communication equipment with selectable modes for accessing stored telephone numbers.

It is another object of the present invention to provide cellular telephone equipment with convenient memory recall procedures for numerous memory locations while using a compact display.

It is further object of the present invention to provide method and apparatus for recalling telephone numbers using either speed-dial access or alphabetic access.

It is still another object of the present invention to provide a user interface for mobile telephone equipment which caters to the memory preference of the user.

These and other objects are achieved according to the invention by providing communication apparatus having a normal mode, a speed-dial mode, and an alpha mode. The communication apparatus enters one of the modes when turned on and enters a different one of the modes in response to activating an input key on the communication apparatus.

When in the normal mode, the apparatus accepts digits corresponding to a telephone number entered from the input keys or accepts input of a memory location storing a telephone number and retrieving the number in response to activation of the input keys. A telephone number is displayed as it is entered or as retrieved from the memory location. The normal mode further stores a displayed number in response to a store command and a desired memory location entered from the input keys. The displayed telephone number can be dialed in response to a send command.

In the speed-dial mode, the communication apparatus retrieves and calls a telephone number stored in the memory in response to activation of an input key (preferably a single keypress) corresponding to a memory location containing the telephone number.

The alpha mode includes the displaying in alphabetic characters of names associated with the storage locations. It is possible to scroll through the stored alphabetic names in response to scroll commands entered from the input keys. An alphabetic name may be stored in the memory in response to providing a store command, the alphabetic characters in the alphabetic name, and the desired memory location which are all entered from the input keys.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 3 is a flowchart showing a preferred embodiment of the normal mode.

DETAILED DESCRIPTION OF PREFERRED EMBODIMENTS

Figure 1:
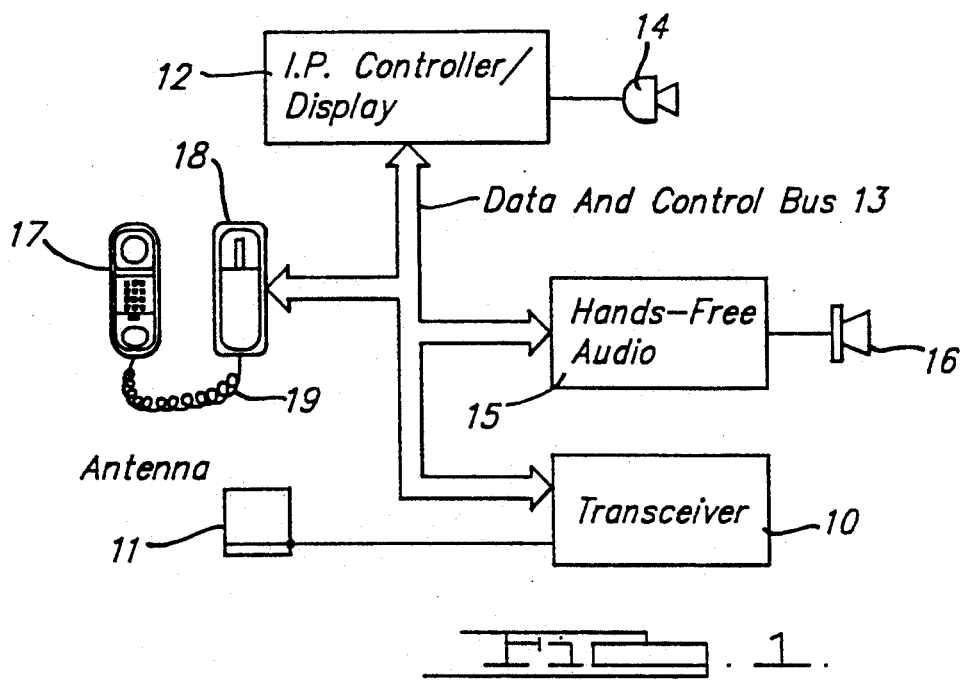
FIG. 1 is a block diagram showing a preferred cellular telephone apparatus according to the present invention.

A preferred system configuration for mobile communication apparatus of the invention specially adapted for use as a cellular telephone system is shown in FIG. 1. A transceiver 10 of conventional construction is connected to an antenna 11 for receiving and transmitting radio frequency communications. An instrument panel controller/display 12 is connected to transceiver 10 through a data and control bus 13. Controller 12 is also connected to a pickup microphone 14. A hands-free audio circuit 15 is connected to bus 13 and to a speaker 16 which can be part of the vehicle audio system. A telephone handset 17 is connected to a hang-up cup 18 through a handset coiled cord 19. The handset and hang-up cup may be located in the vehicle console, for example. Hang-up cup 18 is connected to data and control bus 13 for exchanging signals with controller 12 and transceiver 10.

In operation, controller 12 relays commands initiated by a telephone user to transceiver 10. Controller 12 includes input means and a display for building telephone numbers to be dialed. A memory which is preferably located in transceiver 10 and which is accessible by controller 12 provides storage for frequently called telephone numbers.

Controller 12 is preferably located on the instrument panel of a vehicle for convenient interfacing with the user. Microphone 14 is incorporated in controller 12 for hands-free pickup of audio communication signals (i.e., voice signals). Controller 12 may further include a small beeper transducer to provide incoming call ringer signals and provide a feedback tone when controller buttons are pressed.

Received audio signals are reproduced in the hands-free mode by hands-free audio block 15, including an amplifier for driving speaker 16.

The telephone system preferably enters a handset mode when handset 17 is removed from hang-up cup 18 as sensed by a magnetic reed switch (not shown), for example. The handset may preferably include an earpiece, microphone, volume control, and the reed switch (for sensing a magnet in the hang-up cup). Telephone dialing and other functions are controlled from instrument panel controller/display 12. Alternatively, handset 17 may include input keys and a display for controlling telephone operation, dialing and memory recall, and information display in the same manner described below in connection with instrument panel controller/display 12.

Figure 2:
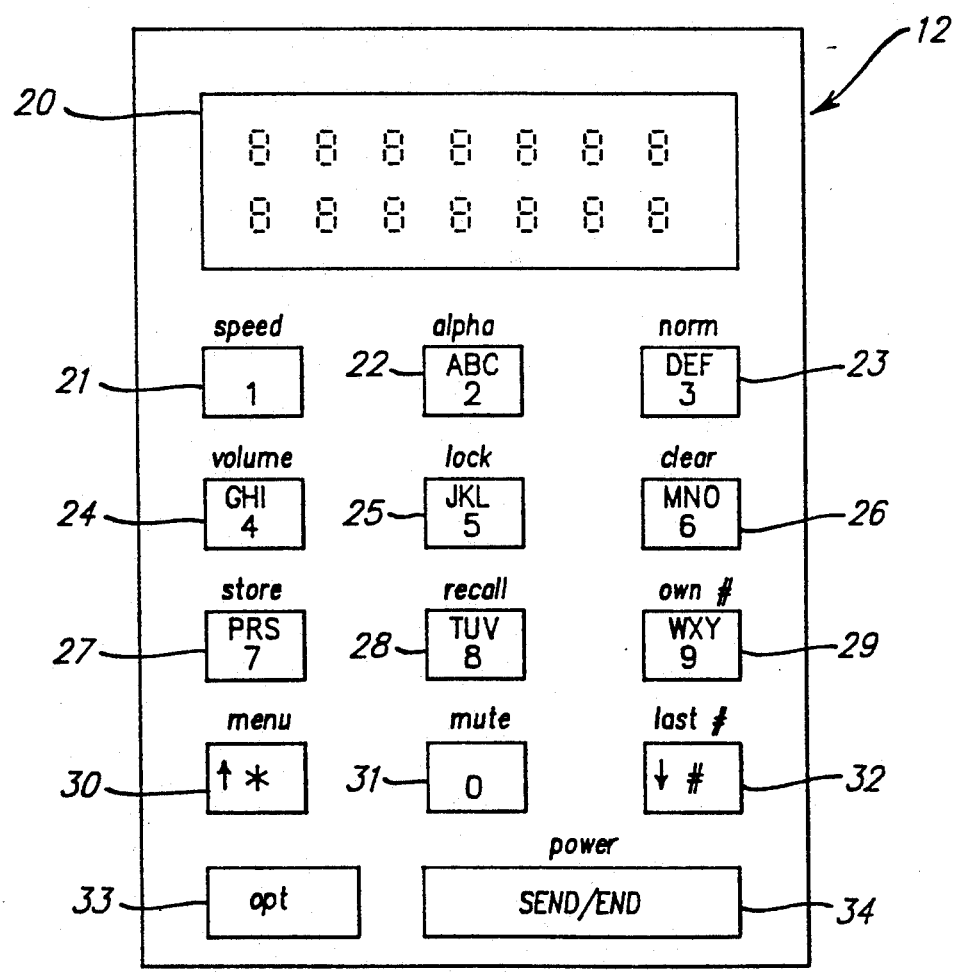
FIG. 2 is a front plan view of the instrument panel controller/display of FIG. 1.
Figure 2:
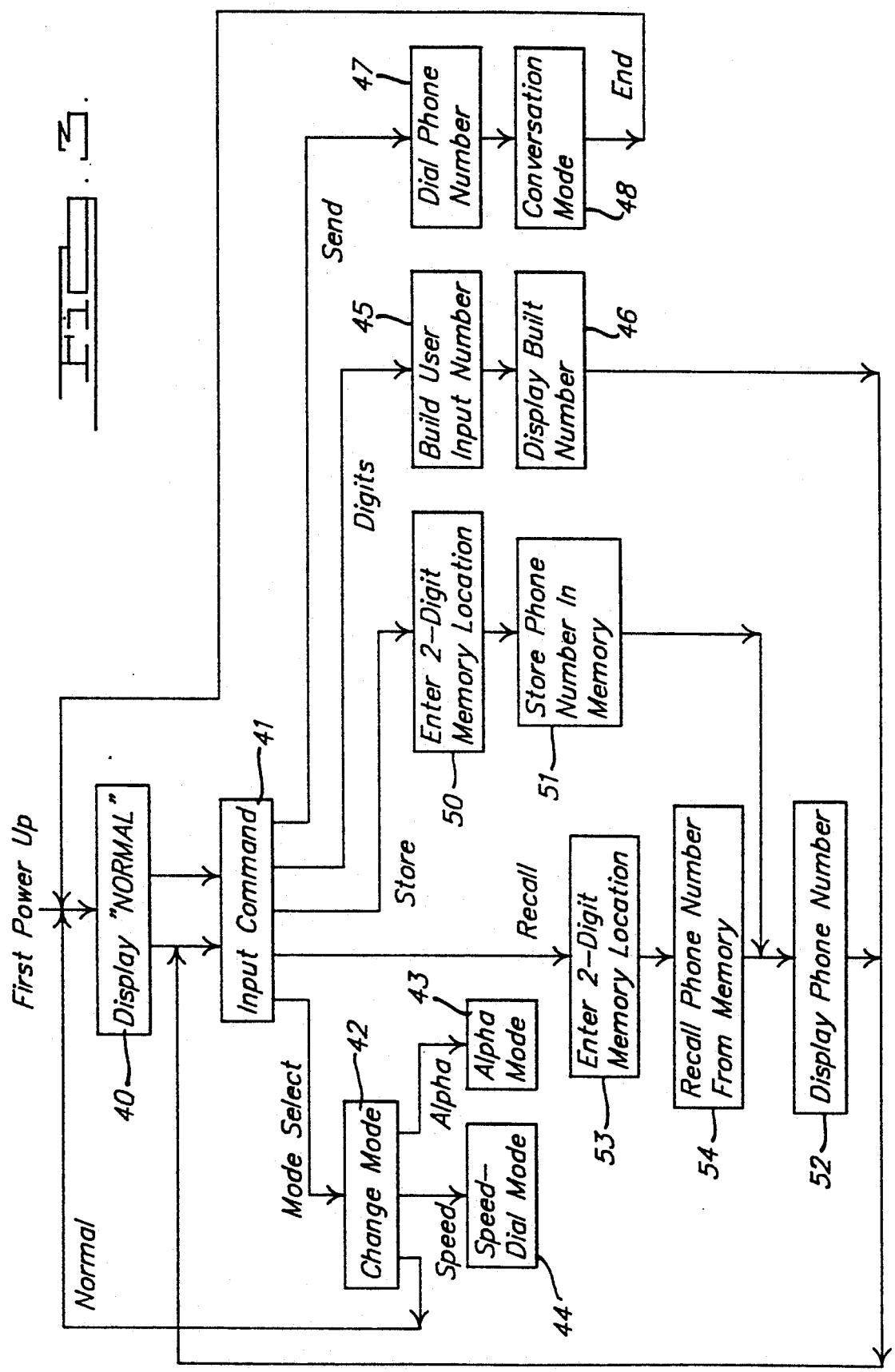

Turning to FIG. 2, instrument panel controller/display 12 is shown in greater detail. A segmented display 20 is shown having 14 alphanumeric characters in two rows and may be comprised of a vacuum fluorescent display or a liquid crystal display, for example. A 14-button keypad matrix includes pushbuttons 21–34. Pushbuttons 21–32 are laid out as a standard telephone dialing keypad including numbers and letters displayed on the faces thereof. Each pushbutton 21–32 also has a second function associated with it which is accessed by first pressing option pushbutton 33. A send/end button 34 provides call initiation and termination commands and has a second function of power-on and power-off switching.

According to the present invention, telephone number entry, telephone number storage and recall, and entry of alphabetic names associated with telephone numbers are controlled using multiple modes of controller/display 12. Memory operation of controller/display 12 is provided such that each storage location address (i.e., a speed-dial code) is associated with storage for containing a telephone number and storage for containing an alphabetic name. A preferred embodiment of the invention employs three operating modes termed the normal mode, the speed-dial mode, and the alpha mode. Stored phone numbers are recalled by memory location in the normal and speed-dial modes and by alphabetic name in the alpha mode.

The secondary functions of the pushbuttons are summarized as follows. Pressing option pushbutton 33 followed by pushbutton 21 accesses the speed-dial mode of controller 12. In the speed-dial mode, a user can initiate a one-touch call to a telephone number assigned to memory locations 1 through 10 by pressing the corresponding keypad buttons (labeled 1 through 0). The secondary function of pushbutton 22 is access to the alpha mode in which a user can place a call by scrolling through a list of alphabetic names previously stored. Accessing the normal mode is the secondary function of pushbutton 23. In the normal mode of operation, the keypad functions as a standard telephone keypad capable of direct entry of numbers and recall of stored telephone numbers in the full set of memory locations.

The secondary function of pushbutton 24 is volume control. After accessing the volume mode, volume can be increased or decreased using up pushbutton 30 and down pushbutton 32.

The secondary function of pushbutton 25 is the lock function wherein the keypad can be locked so that making and receiving calls is not allowed. Display 20 shows the word "LOCKED" when this feature is active.

The secondary function of pushbutton 26 is the clear function. If an error is made entering an alphabetic character or dialing a number, it is cleared one digit or character at a time by pressing the clear pushbutton sequence.

The secondary "store" function of pushbutton 27 stores numbers and data to memory. The recall function of pushbutton 28 recalls the previously stored numbers and data.

The secondary function of pushbutton 29 permits display of the telephone number assigned to the particular cellular telephone.

The secondary function of pushbutton 31 is a mute function which mutes and unmutes the microphone for conducting private conversations in the vehicle and for changing from handset to hands-free operation.

The "last number" secondary function of pushbutton 32 recalls the last number which was dialed.

The normal mode of operation is shown in more detail in the flowchart of FIG. 3. When the apparatus is first powered up (i.e., after initial connection to battery power and turning on of the phone), the cellular telephone enters the normal mode and the word "NORMAL" is displayed in step 40. In step 41, the normal mode responds to various input commands entered using the keypad. If the input command is a mode select command, the mode is changed in step 42 where a transfer to alpha mode can be made at step 43, a transfer to speed-dial mode can be made at step 44, or a return to normal mode is made in step 40.

If the input command received at step 40 corresponds to digits being entered at the keypad, a telephone number is sequentially built up in step 45. In step 46, each digit is displayed as a telephone number is built up. After each digit is input and displayed, a return is made to input command step 41 for receiving more digits or other commands.

When a complete telephone number has been entered and displayed, a send command entered at the keypad causes the telephone number and a send command to be transferred to the transceiver which dials the number in step 47. When a call is initiated, the cellular telephone enters a conversation mode in step 48. If the handset is out of its hang-up cup when a call is initiated, the cellular telephone enters a handset operation mode, otherwise a hands-free operation mode is used. The user can switch from hands-free mode to handset mode during a conversation by picking up the handset. Switching from handset mode to hands-free mode requires activating the mute function and then hanging up the handset in the hang-up cup. The conversation mode of step 48 is terminated in response to an end command and a return is made to the normal mode entry point at step 40.

With a complete telephone number displayed, input command block 41 also accepts a store command to store the displayed number. After sending a store command, a user is prompted in step 50 to enter a two-digit memory location (assuming there are 100 memory storage locations available). Upon the entry of the second digit in the memory location, the telephone number is stored in memory in step 51 and the telephone number is again displayed in step 52. The telephone number having been stored in memory, a return is made to input command block 41.

When at input command block 41, a previously stored telephone number can be recalled in response to a recall command. The user is prompted for the two-digit memory location containing the desired telephone number in step 53. The telephone number is recalled from memory in step 54 and is displayed in step 52. A return is then made to input command block 41. Thus, the normal mode provides for memory access for either telephone number storing or for recalling based upon a two-digit memory location (i.e., speed-dial code).

Figure 4:
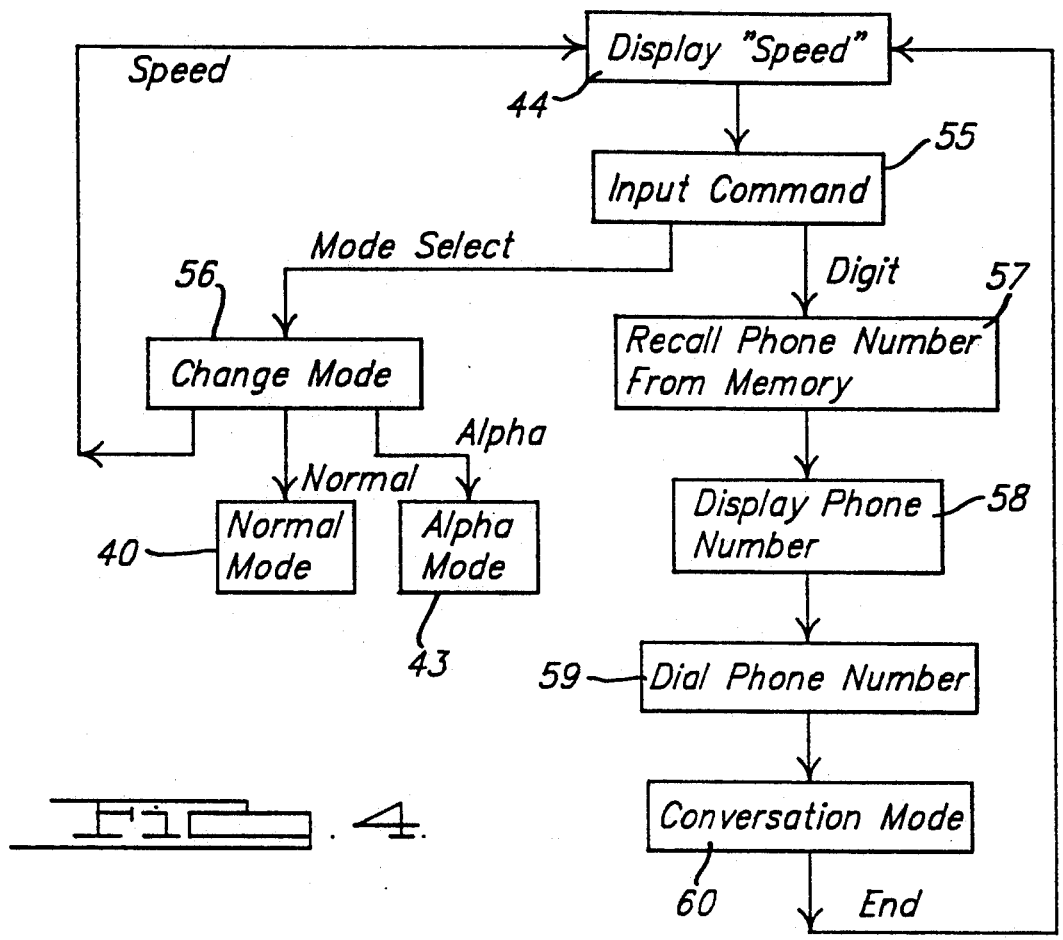
FIG. 4 is a flowchart showing a preferred embodiment of the speed-dial mode.

The speed-dial mode of the present invention is shown in greater detail in FIG. 4. In step 44, the word "SPEED" is displayed to indicate activation of the speed-dial mode. Input commands are accepted at input command block 55. In response to a mode select command, a change mode can be executed in step 56 into either the normal mode in step 40, the alpha mode in step 43, or a return to the speed-dial mode in step 44.

Other valid input commands in the speed-dial mode are the entry of a single digit to recall a telephone number from memory in step 57. Thus, only the first 10 memory locations can be accessed in the speed-dial mode corresponding to the 10 keypad pushbuttons corresponding to digits 0 through 9. The recalled telephone number is displayed in step 58 and a call is initiated to the telephone number in step 59. The conversation mode is entered in step 60 until an end command terminates the call and returns to the display "SPEED" step 44.

Figure 5:
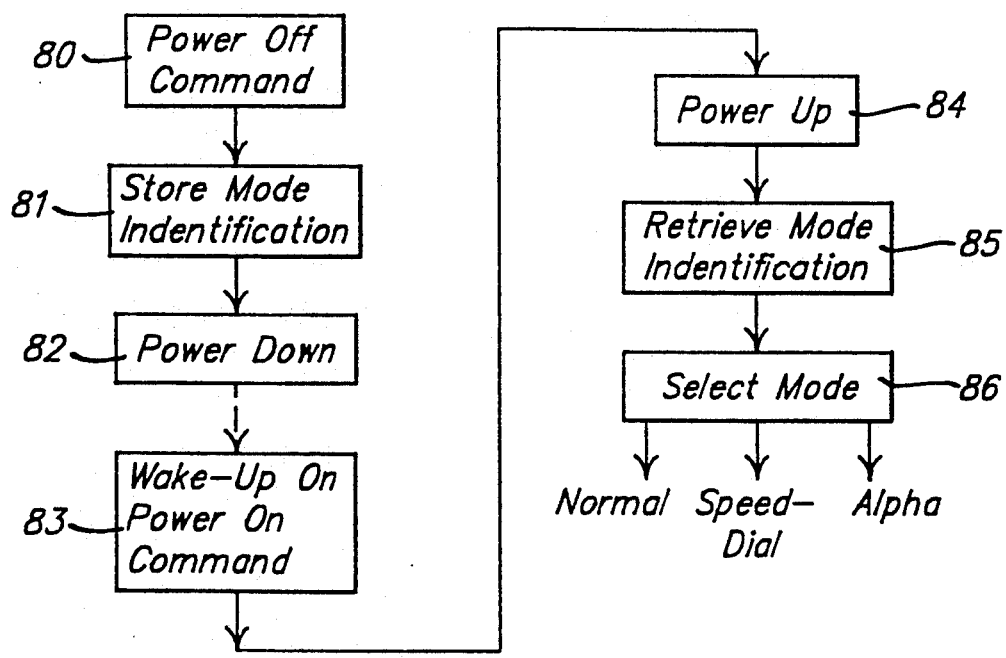
FIG. 5 is a flowchart showing a preferred embodiment of the alpha mode.

The alpha mode of the present invention is shown in greater detail in FIG. 5. The word "ALPHA" is displayed in step 43 and input commands are then accepted at input command block 62. In response to a mode select command, a change of mode can be accomplished in step 63 to a normal mode in step 40, a speed-dial mode in step 44, or a return to alpha mode at step 43.

Alphabetic names can be stored in order to reference a telephone number stored in a particular memory location by entering a store command from input command block 62. The display is cleared in step 64 and a first character can be selected in step 65. A character is selected by pressing a pushbutton corresponding to the desired letter. Pressing a pushbutton will cycle through the letters corresponding to that button, e.g., pressing pushbutton marked "2" cycles through the letters A, B and C. In addition, pressing the pushbutton marked "7" cycles through the four letters P, Q, R and S, and the pushbutton marked "9" cycles through letters W, X, Y and Z. When the desired character is in the display, it is selected by pressing the "*" pushbutton (i.e. showing the asterisk symbol). While cycling through letters entered from the keypad, the display shows the currently selected character in step 66. When the desired letter is displayed and the asterisk pushbutton is pressed, the next display character is selected in step 67 and the display is again updated for any subsequently entered letters in step 66.

Once the desired name is displayed, another store command is issued by the user and the user is prompted to enter a two-digit memory location in step 68. In an alternative embodiment, the user may also be prompted to enter a telephone number at this time. In step 69, the name is stored in memory in association with the corresponding telephone number, then a return is made to input command block 62.

The present invention provides for browsing through previously stored alphabetic names while in the alpha mode.

From input command block 62, jump characters may be entered in order to display the first name beginning with a particular jump character in step 70. Repeatedly pressing a pushbutton cycles through the letters corresponding to that pushbutton. When the desired letter is displayed, the up or down (i.e., * or #) pushbutton jumps to the first name beginning with the selected jump character. In a preferred embodiment, the first name beginning with a particular letter is the one of the names beginning with that character which has the lowest memory location.

Scrolling through names beginning with a particular jumped-to character is initiated from input command block 62 by pressing the * or # pushbuttons. Scrolling in the present preferred embodiment wraps around from the first name to the last name and vice versa within those names beginning with a particular initial character when scrolling up when at the first name or scrolling down when at the last name in that list, respectively.

In step 71, a check is made to determine if a stored alphabetic name is currently displayed which defines the initial character for scrolling. If a name is not already displayed, a recall of the last displayed name is performed in step 72 and a return is made to input command block 62. If a name is already displayed, a check is made for scrolling up or down (i.e., * or #) in step 73. If scrolling up, the previous name in memory beginning with the same initial character is displayed in step 74. Otherwise, the next name is displayed in step 75. If there are no other names in memory beginning with the same initial character, the presently displayed name remains in the display. A return is then made to input command block 62.

A further input command in the alpha mode is the send command. In response to a send command, a check is made in step 76 to determine whether a name is displayed. If not, a return is made to input command block 62 and an error message can be displayed, if desired. If a valid name is currently displayed, then a telephone number corresponding to the displayed name is recalled in step 77 and the telephone number is dialed in step 78. When a call is initiated, the conversation mode is entered in step 79 until an end command is executed which returns control to display "ALPHA" step 43.

Figure 6:
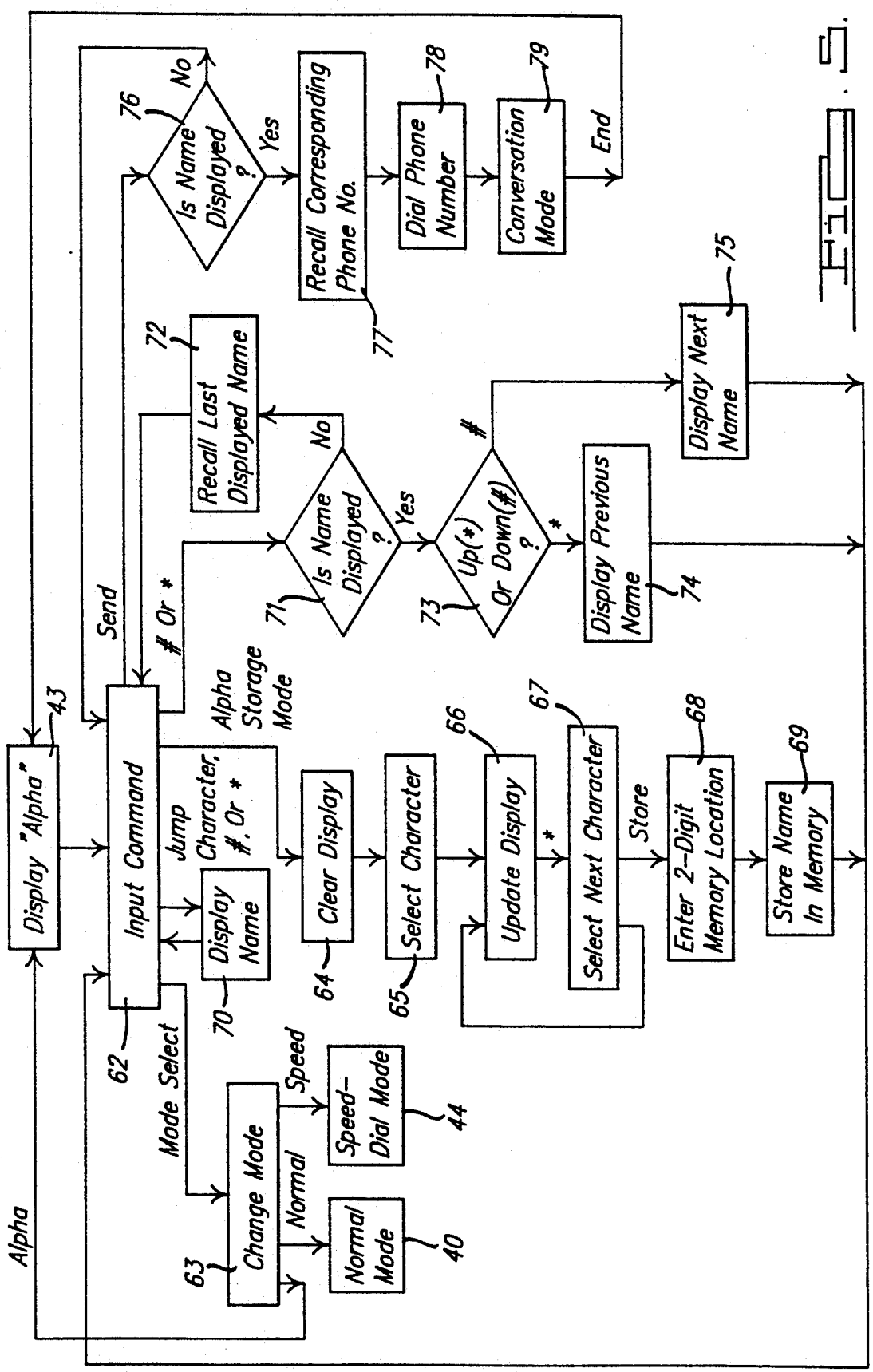
FIG. 6 is a flowchart showing the sequence of operations when power is turned off and then back on in the apparatus of FIG. 1.

The procedure employed in response to the turning off of the cellular telephone is shown in FIG. 6. A power-off command is issued in step 80 (e.g., by pressing the second function of the send/end pushbutton). A mode identifier is stored in step 81 to allow a restoration of the current mode upon subsequent turning on of the cellular telephone. In step 82, Power is turned off to the transceiver and other cellular telephone equipment.

In step 83, a power-on command is received causing the cellular telephone to wake up from its power-down state. Thus, in step 84, power is restored to the transceiver and other cellular telephone equipment. The previous mode identifier is retrieved in step 85 and the corresponding mode is selected in step 86.

Figure 7:
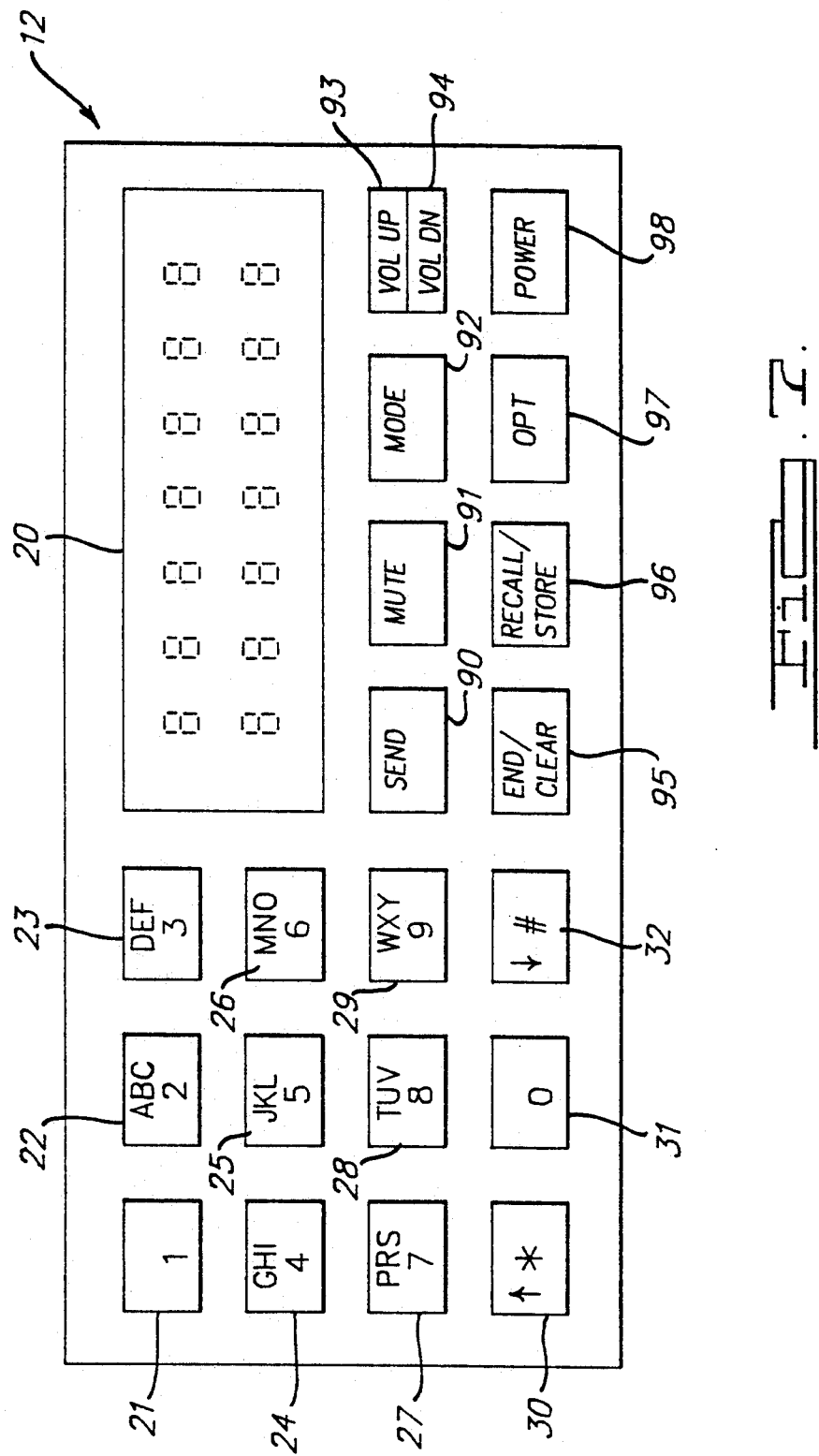
FIG. 7 is a front plan view of an alternate embodiment of the instrument panel controller/display of FIG. 1.

FIG. 7 shows an alternate embodiment for instrument panel controller/display 12 including additional pushbuttons to avoid the need for secondary functions associated with pushbuttons. Thus, specific functions are accessed by pushbuttons 90-98. For example, controller 12 can cycle through the normal, speed-dial, and alpha modes by repeatedly depressing mode pushbutton 92. Other pushbuttons provide the same actions as previously described.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A user interface for a mobile cellular phone having a memory, a display, and a plurality of input keys numbered 0 through 9 wherein each of said keys numbered 2 through 9 corresponds to at least three respective alphabetic characters, each of said alphabetic characters being selectable by activating a respective key a predetermined number of times, said interface comprising:

an alpha mode displaying names corresponding to respective phone numbers, said names and phone numbers being stored in said memory, and said alpha mode including a scrolling function, a jump function, a storing function, and a call initiating function;

wherein said scrolling function provides scrolling through and displaying said names beginning with a common alphabetic character selected by performing said jump function, said scrolling function being performed in response to a scrolling command entered from selected one of said input keys not corresponding to an alphabetic character, said scrolling function providing wrapping around within names beginning with a common alphabetic character;

wherein said jump function provides jumping to and displaying names beginning with a selected alphabetic character in response to activating one of said input keys corresponding to said selected alphabetic character;

wherein said storing function provides for adding a name to said memory which is entered from said input keys; and wherein said call initiating function initiates a call to the phone number corresponding to the displayed name.

2. The user interface of claim 1 further comprising:

a normal mode displaying phone numbers or memory storage locations of said memory entered from said input keys and including a storing function, a recall function, and a call initiating function;

wherein said recall function provides for recalling a phone number corresponding to a displayed memory storage location within said memory.

3. The user interface of claim 2 further comprising:

a speed-dial mode for initiating a call to a stored phone number upon activating a single one of said input keys corresponding to a desired memory storage location within said memory.

4. A method for operating a vehicular communication apparatus including a memory, a display, and a plurality of input keys, said apparatus having a normal mode, a speed-dial mode, and an alpha mode, said method comprising the steps of:

entering one of said modes in response to turning on of said apparatus; and entering a different one of said modes in response to activating at least one of said input keys;

wherein said normal mode comprises the steps of:

displaying an indication that said normal mode is active;

accepting digits corresponding to a phone number entered from said input keys or accepting input of a memory location storing a phone number and retrieving said phone number in response to activation of said input keys;

displaying said phone number as it is entered or as retrieved from said memory location;

storing a displayed phone number in response to a store command and a desired memory location within said memory entered from said input keys; and calling said displayed phone number in response to a send command entered from said input keys;

wherein said speed-dial mode comprises the steps of:

displaying an indication that said speed-dial mode is active;

retrieving and calling a phone number stored in said memory in response to activation of an input key; and displaying said retrieved phone number; and wherein said alpha mode comprises the steps of:

displaying an indication that said alpha mode is active;

displaying and scrolling through stored alphabetic names each corresponding to a respective phone number in a respective memory location in response to a jump command for displaying an alphabetic name beginning with an alphabetic character selected by a corresponding input key and scroll commands entered from input keys not corresponding to an alphabetic character for displaying another alphabetic name beginning with said selected alphabetic character, wherein said scrolling wraps around within said stored alphabetic names beginning with said selected alphabetic character;

storing an alphabetic name in said memory in response to a store command, alphabetic characters, and a desired memory location entered from said input keys; and calling the phone number corresponding to said displayed alphabetic name in response to a send command entered from said input keys.

5. The method of claim 4 further comprising the step of storing an identification of the one of said modes which is active when said apparatus is turned off, and wherein the mode entered in response to turning on of said apparatus is determined in response to said stored indentification.

6. The method of claim 4 wherein the memory locations accessible in said speed-dial mode is a subset of the memory locations accessible in said normal mode.

7. The method of claim 4 further comprising the step of entering a conversation mode in response to said send command from said normal mode, said speed-dial mode, or said alpha mode, said conversation mode comprising the steps of:
- accepting digits corresponding to a phone number entered from said input keys;
- displaying said phone number as it is entered;
- storing a displayed phone number in response to a store command and a desired memory location entered from said input keys; and
- terminating a call and returning to the last mode previously active prior to said conversation mode in response to an end command entered from said input keys.

8. The method of claim 7 wherein said conversation mode further comprises audio transducing selectable between hands-free operation and handset operation.

9. Mobile communication apparatus for a vehicle having an instrument panel, comprising:
- a memory for storing a plurality of phone numbers each having a respective storage location;
- an alphanumeric display on said instrument panel;
- a plurality of input keys on said instrument panel numbered 0 through 9 wherein each of said keys numbered 2 through 9 corresponds to at least three respective alphabetic characters, each of said alphabetic characters being selectable by activating a respective key a predetermined number of times;
- a transceiver; and
- controller means coupled to said memory, said display, said input keys, and said transceiver for controlling said display, said memory, and said transceiver in response to said input keys to provide a normal mode, a speed-dial mode and an alpha mode, said alpha mode displaying names corresponding to respective phone numbers and including a scrolling function, a jump function, a storing function, and a call initiating function;
- wherein said scrolling function provides scrolling through and displaying said names beginning with a common alphabetic character selected by performing said jump function, said scrolling function being performed in response to a scrolling command entered from selected one of said input keys not corresponding to an alphabetic character, said scrolling function providing wrapping around within names beginning with a common alphabetic character;
- wherein said jump function provides jumping to and displaying names beginning with a selected alphabetic character in response to activating one of said input keys corresponding to said selected alphabetic character;
- wherein said storing function provides for adding a name to said memory which is entered from said input keys; and
- wherein said call initiating function initiates a call to the phone number corresponding to the displayed name.

10. The apparatus of claim 9 wherein said normal mode displays phone numbers or memory storage locations entered from said input keys and wherein said normal mode includes a storing function, a recall function, and a call initiating function, wherein said recall function provides for recalling a phone number corresponding to a displayed memory storage location.

11. The apparatus of claim 10 wherein said speed-dial mode initiates a call to a stored phone number upon activating a single one of said input keys corresponding to a desired memory storage location.

* * * * *